United States Patent [19]

Vetrini

[11] Patent Number: 5,146,947
[45] Date of Patent: Sep. 15, 1992

[54] CONDENSATE DRAINAGE FOR GASEOUS FUEL FIRED CONDENSATION BOILERS

[75] Inventor: Gianni Vetrini, Teramo, Italy

[73] Assignee: AFA-TEC S.r.l., Notaresco, Italy

[21] Appl. No.: 727,044

[22] Filed: Jul. 9, 1991

[30] Foreign Application Priority Data

Jul. 30, 1990 [IT] Italy ................................. 35940 [U]

[51] Int. Cl.⁵ .......................................... F16K 131/18
[52] U.S. Cl. ................................. 137/433; 137/429; 110/203
[58] Field of Search .................... 110/203; 165/921; 137/433, 429

[56] References Cited

U.S. PATENT DOCUMENTS

| 3,269,403 | 8/1966 | Smallpeice | 137/433 |
| 4,729,328 | 3/1988 | Shellenberger | 110/203 X |
| 4,995,375 | 2/1991 | Jackson | 110/203 X |

FOREIGN PATENT DOCUMENTS 324883 9/1920 Fed. Rep. of Germany ...... 137/433

*Primary Examiner*—Edward G. Favors
*Attorney, Agent, or Firm*—Pollock, Vande Sande & Priddy

[57] ABSTRACT

A condensate drainage device employed as a safety device for preventing the discharge gases produced by combustion from flowing out through the condensate drainage conduit, in condensation boiler apparatuses.

3 Claims, 5 Drawing Sheets 5,146,947

CONDENSATE DRAINAGE FOR GASEOUS FUEL FIRED CONDENSATION BOILERS

FIELD OF THE INVENTION

This invention relates to a condensate drainage device for gaseous fuel fired condensation boilers.

More particularly, this invention relates to a condensate drainage device which is employed as a safety device in order to prevent the discharge gases produced by combustion from going out through the condensate drainage conduit in condensation boiler devices.

BACKGROUND OF THE INVENTION

As is well known, condensation boilers are a particular kind of heat generators, which are designed for cooling the combustion products down to a temperature below the dew point of the burnt gas, so that the partial condensation of water formed in the combustion reaction is obtained, said water usually leaving the boiler itself in the form of overheated steam.

According to the rules in force at present, gas-fired boilers whose power is lower than 30,000 kcal/hr can also installed in residential buildings.

In that case, the pipe for discharging smokes is connected to the flue and, as an alternative, to the outside with a short connecting pipe through an outer wall.

The condensate is then expelled through the sewer system of the house itself.

In order to prevent the possible egress of discharge gases through the condensate drainage conduit, the conduit itself is conventionally configured as a "drain-trap" so as to create, with the liquid that forms and accumulates within such trap, a hydraulic seal of the conduit that allows the condensate to be drained, which prevents the toxic discharge gases from passing, so that they cannot flow into the various rooms through the sewer system.

It has been observed that sometimes working conditions can occur in such systems, in which no condensate forms or in which the condensate, though formed at first during the starting step, can progressively evaporate.

Among such conditions one could mention, for instance, the case in which a condensation boiler in installed in a conventional heating plant designed for operating at a return temperature higher than the dew point temperature.

Under such condition, an amount of water sufficient to fill the drain trap is unlikely to form, so that there is insufficient water for hydraulically closing said condensate drain trap.

Such condition is a source of possible danger, owing to the fact that burnt gases may be conveyed so as to leave the pressurized combustion chamber partially through the condensate drainage connecting pipe so that they flow into inhabited rooms.

Accordingly, it is evident that there is a need for a further safety device that operates as a burnt gas interceptor and that prevents the burnt gases from flowing into the inhabited rooms when the hydraulic drain-trap does not form.

SUMMARY OF THE INVENTION

To this ends the present invention proposes that the boiler be provided with a condensate drainage device connected to the condensate-connecting tank, said device being provided with a closing member that opens only when in contact with water, and that the drainage pipe of such device through which pipe the condensate is drained should be connected with a drain-trap connecting pipe which is assembled in series with the drainage device in order to ensure further safety against gas leakage.

Accordingly, an object of the invention is a condensate drainage device comprising an outer body which consists of a cover portion and of a bottom portion, the cover portion comprising a first member for connection with the burnt gas and condensate inlet conduit, and the bottom portion comprising a second portion for connection with the condensate drainage conduit. The device also it comprises a float which is provided in its bottom portion with an annular housing for realizing a seat for a tight seal gasket, a gap being is provided between said float and said outer body for the passage of the condensate. The gasket housed within said annular housing engages with the mouth of said second connection, so as to prevent the condesate and/or the gas from being drained, and the float is provided at its top with a projecting portion which engages with a corresponding cavity provided in the inside of said cover portion of said outer body so as to perform the function of a guiding, aligning and stop member for the float itself.

According to the invention, the inner part of the bottom portion of the outer body is provided with guiding ribs which are intended for engagement with the float itself, in order to facilitate a correct stroke of the float itself in the vertical direction.

Finally, said second connecting member is provided with a connection with a draintrap shaped drainage pipe, said pipe forming a further safety member.

BRIEF DESCRIPTION OF THE DRAWINGS

The invention will be more clearly understood by reference to the attached drawings, wherein.

DESCRIPTION OF PREFERRED EMBODIMENT

Figure 1:
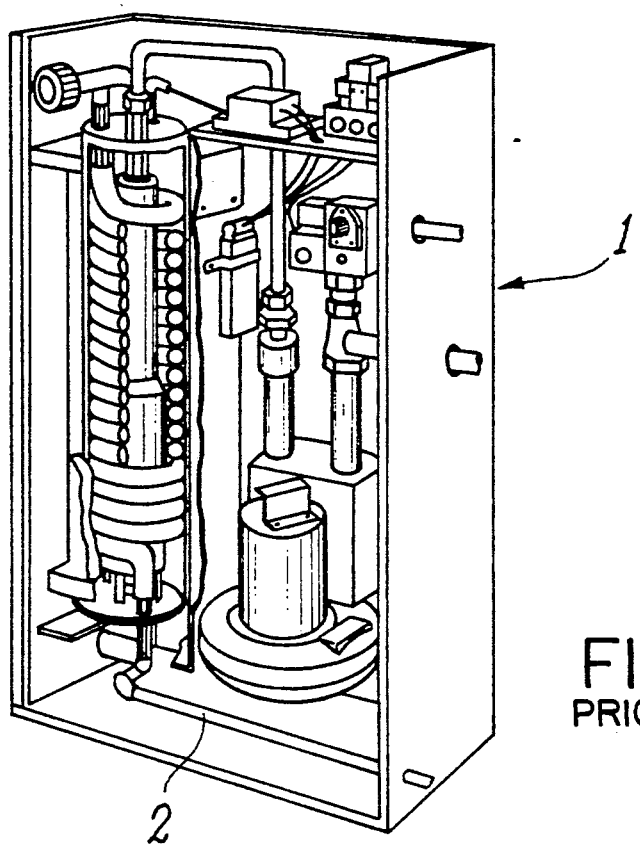
FIG. 1 is a schematic perspective view of a gas fired condensation boiler.
Figure 2:
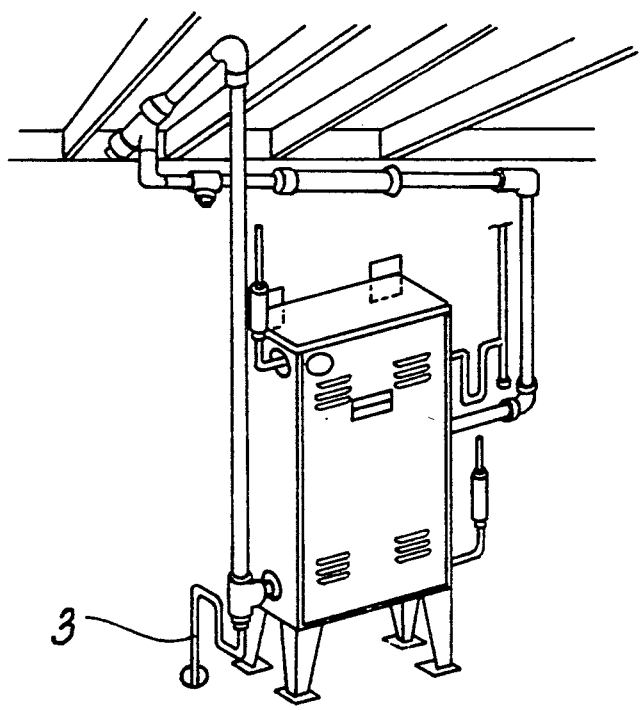
FIG. 2 is a shematic perspective view of a boiler installed in a residential building.

As shown in FIGS. 1 and 2, a conduit for the drainage of the condensate is provided in conventional gas-fired boilers 1, said conduit being arranged directly below the condensate collection tanks or at the base of the exchanger which is generally connected to the various members of the sewer system of the residential building wherein it is inserted through a drain-trap connection pipe 3.

Figure 3:
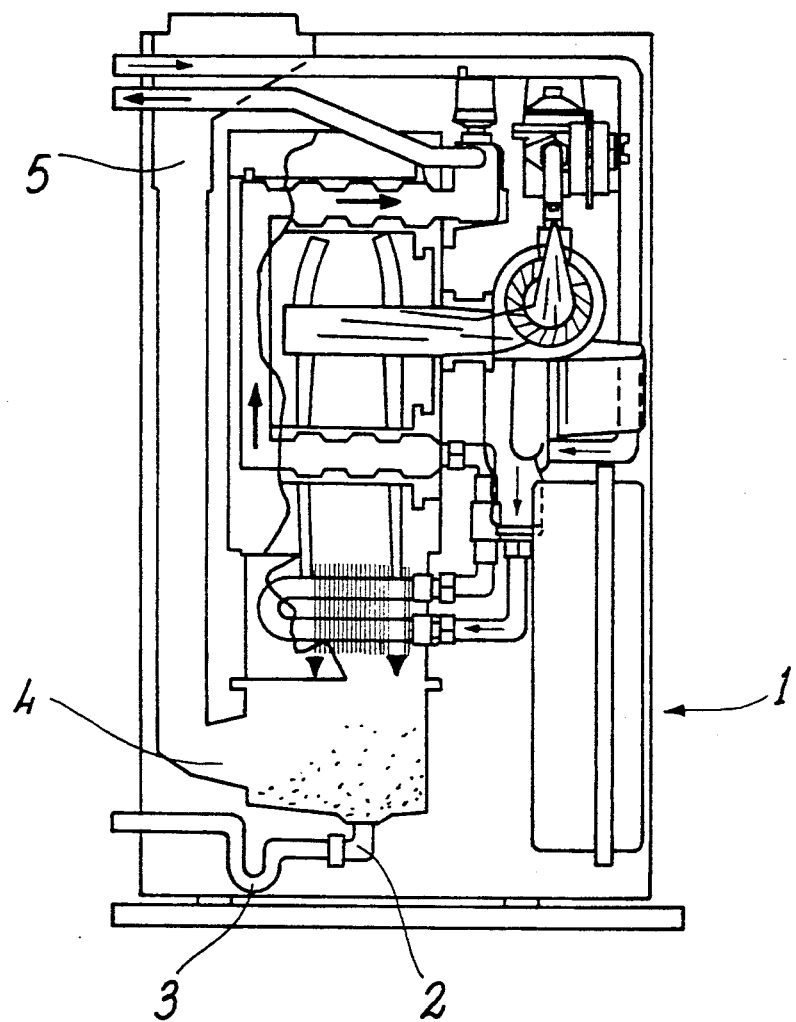
FIG. 3 is a front elevation view of a boiler incorporating a drain-trap condensate drainage device.

Such drain-trap connection pipe is arranged in a position outside the boiler 1 in the arrangement shown in FIG. 2, whereas, in the configuration shown in FIGS. 3, said pipe is provided at a point corresponding to the lower portion of the device, on the bottom of the condensate collection space which is placed at the end of the smoke discharge conduit 5.

Figure 4:
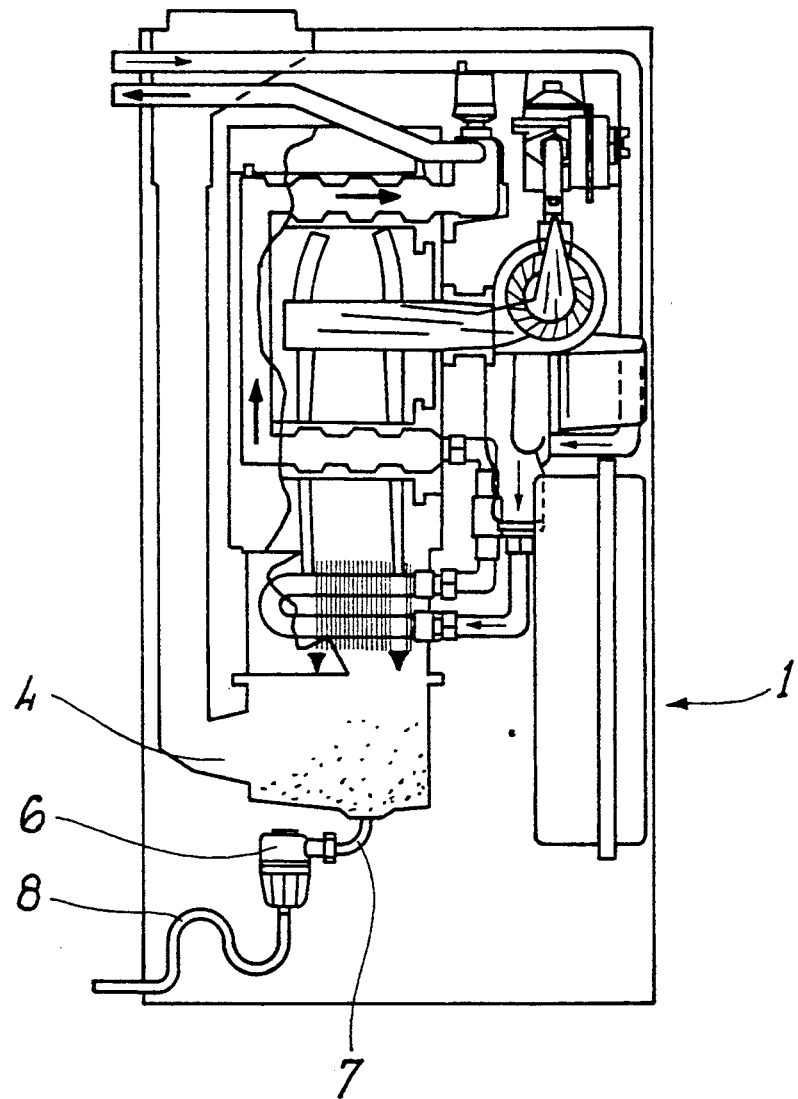
FIG. 4 is a front elevation view of a boiler provided with a condensate drainage device and with a drain-trap device which is assembled internally.

FIG. 4 illustrates to schematically the arrangement of the condensate drainage device 6 according to the invention, said device being provided at a point corresponding to the lower portion of the boiler 1, and being connected to the condensate collection tank 4 through a pipe 7.

This last-mentioned pipe, according to a preferred embodiment of the invention, is a stainless steel pipe preferably of 14 mm diameter, which is connected directly with the bottom of the heat exchanger, where the condensate is collected.

Water flowing out of the condensate drainage device 6 is removed through a pipe 8 which is preferably silicone-treated and in the shape of a drain trap as a second safety member which is series-connected with said condensate drainage device 6.

Figure 5:
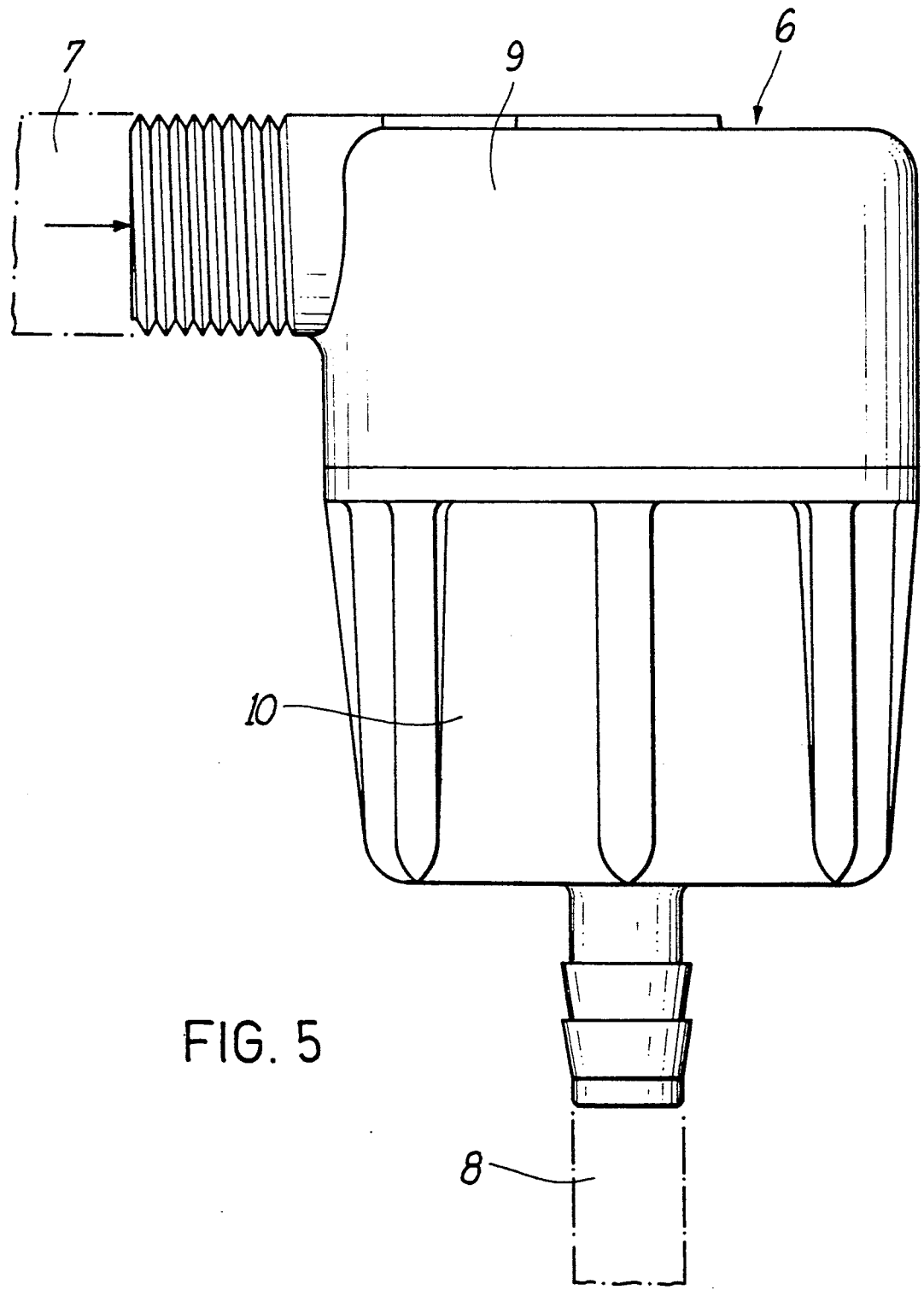
FIG. 5 is a side view of the condensate drainage device according to the invention.

FIG. 5 is a side view of the condensate drainage device 6 together with the hydraulic connections 7 and 8.

The device 6 consists indeed of a plastic material body made up of an upper portion 9 comprising the portion for connection with the inlet pipe of the burnt gas-condensate mixture as well as of a lower portion 10 comprising the connection with the drain-trap shaped pipe 8.

Figure 6:
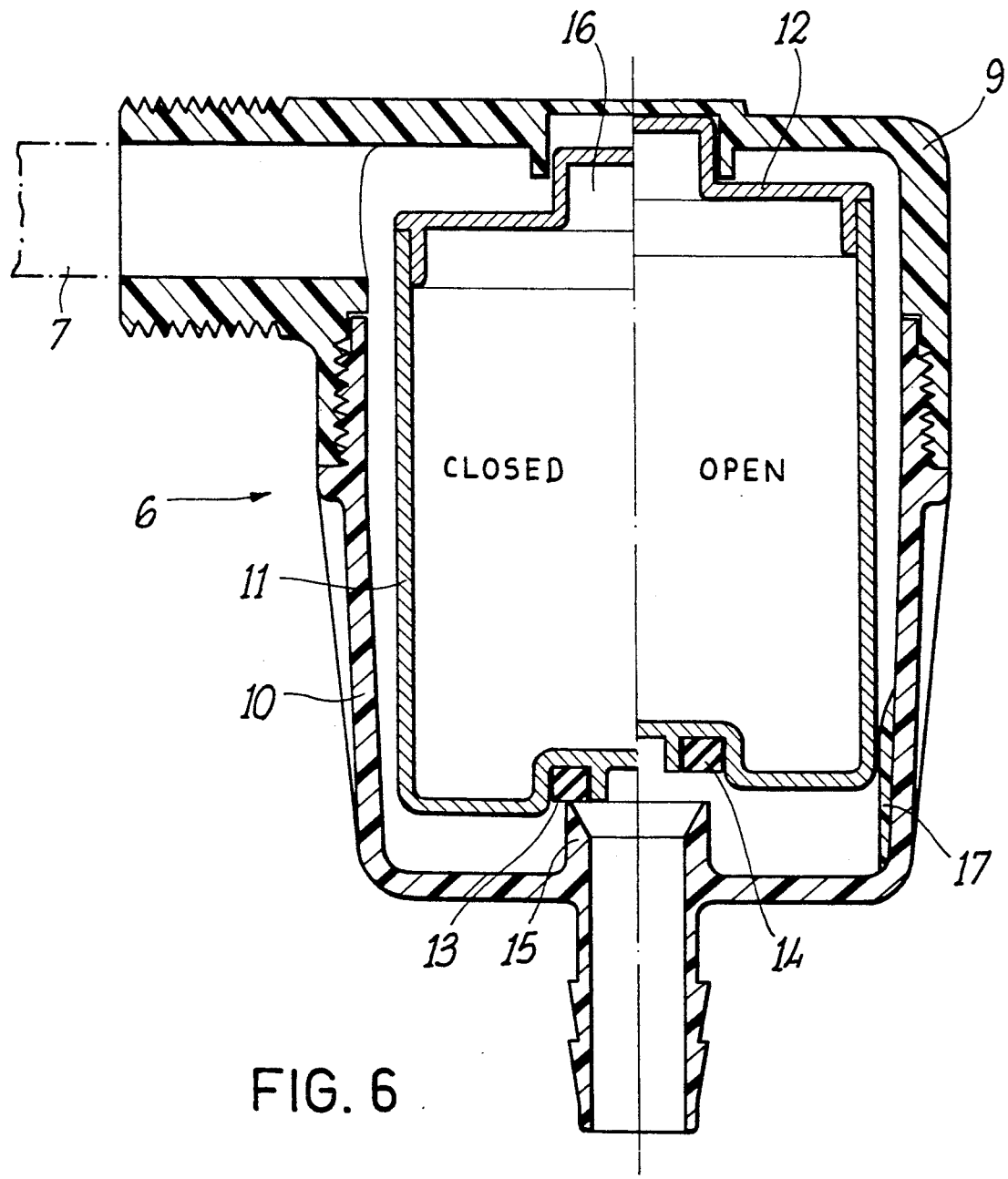
FIG. 6 is a vertical cross-sectional view of the condensate drainage device.

A cylindrical float 4 provided with a cover 12 is arranged inside the outer body of the device 6 (see FIG. 6), said float being guided along its vertical stroke and being illustrated respectively in the open and closed positions in FIG. 6.

A housing 13 for a gasket 14 that closes the orifice in the lower portion of the body of the condensate drainage device is provided in the lower portion of the body 11 of the float itself.

When the boiler 1 is started, there is no condensate, so that the drain-trap pipe 8 which is series-connected to the condensate drainage device 6 is empty.

Because of the pressure existing in the combustion chamber, gases might flow through the drain-trap itself till reaching the outside environment.

This is prevented from occuring as a result of the fact that the float mentioned above is in the closed position, its gasket 14 pressing the neck 15 of the connection portion with said pipe 8, thereby preventing the gaseous mixture from leaking.

When the first amount of condensate arrives, the volume between the body 10 of the condensate drainage device 6 and the body 11 of the float that is thus pushed upwards increases so as to make it possible to remove the gaseous mixture through the discharge orifice.

The condensate water will thus flow into the drain-trap 8 and will fill the same so that said pipe 8 will be a further safety member against the dispersion of gases into the environment.

It is to be observed that a seat is provided in the cover portion 9 of said condensate drainage device, said seat performing the function of guiding and of acting as an end of stroke for the float during its vertical stroke, as the projecting portion 16 of the cover portion 12 of the float itself engages with said seat.

In an analogous way, for a correct alignment of the float during its stroke, some radial guide ribs 17 are provided in the inside of said body 10.

In the steady state operation, just condensate flows out of the condensate drainage device.

If no condensate water is formed as a consequence of malfunctioning, the float goes back into the closure position and intercepts the conduit even if the drain-trap downstream of the same becomes empty by accident.

I claim:

1. A condensate drainage device for gaseous fuel fired condensation boilers, comprising an outer body consisting of a cover portion and of a bottom portion, said cover portion having a first member for connection with an inlet conduit for condensate and burnt gases, said bottom portion having a second portion for connection with a condensate drainage conduit, and a float which is provided in its bottom portion with an annular housing for a tight seal gasket, a gap for passage of condensate being provided between said float and said outer body, said gasket housed within said annular housing engaging with a mouth of said second connection portion, thereby preventing condensate and/or gas from being drained, and said float comprising a top portion provided with a projecting part engaging with a corresponding cavity provided in an inner part of said cover portion of said outer body.

2. A condensate drainage device for gaseous fuel fired condensation boilers according to claim 1, wherein the inner part of the bottom portion of said outer body is provided with guiding ribs which engage with said float.

3. A condensate drainage device for gaseous fuel fired condensation boilers according to claim 1, wherein said second member for connection with said condensate drainage conduit has a projecting upper portion engaging with said gasket.

* * * * *